(12) United States Patent
Tanizawa (10) Patent No.: US 12,036,858 B2
(45) Date of Patent: Jul. 16, 2024

(54) ARRANGEMENT STRUCTURE OF DRIVE UNIT AND POWER SUPPLY UNIT IN ELECTRIC VEHICLE

(71) Applicant: MITSUBISHI JIDOSHA KOGYO KABUSHIKI KAISHA, Tokyo (JP)

(72) Inventor: Shoji Tanizawa, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 321 days.

(21) Appl. No.: 17/761,755

(22) PCT Filed: Nov. 9, 2020

(86) PCT No.: PCT/JP2020/041650
§ 371 (c)(1),
(2) Date: Mar. 18, 2022

(87) PCT Pub. No.: WO2021/145057
PCT Pub. Date: Jul. 22, 2021

(65) Prior Publication Data
US 2022/0371421 A1    Nov. 24, 2022

(30) Foreign Application Priority Data

Jan. 17, 2020 (JP) .................................. 2020-006234

(51) Int. Cl.
*B60K 1/04* (2019.01)
*B60L 53/22* (2019.01)
*B62D 21/02* (2006.01)

(52) U.S. Cl.
CPC ................ *B60K 1/04* (2013.01); *B60L 53/22* (2019.02); *B62D 21/02* (2013.01); *B60K 2001/0405* (2013.01); *B60L 2210/40* (2013.01)

(58) Field of Classification Search
CPC ...... B60K 2001/001; B60K 2001/0422; B60K 2001/0433; B60K 2001/0438;
(Continued)

(56) References Cited

U.S. PATENT DOCUMENTS 7,051,825 B2 * 5/2006 Masui .................... B60L 50/16
280/783
8,393,426 B2 * 3/2013 Takahashi ............... B60K 1/04
180/68.5
(Continued)

FOREIGN PATENT DOCUMENTS

| JP | 2013-184497 A | 9/2013 |
| JP | 2013-230731 A | 11/2013 |

(Continued)

OTHER PUBLICATIONS

International Search Report (PCT/ISA/210) issued in PCT/JP2020/041650, dated Dec. 22, 2020.
(Continued)

*Primary Examiner* — Jeffrey J Restifo
(74) *Attorney, Agent, or Firm* — Birch, Stewart, Kolasch & Birch, LLP (57) ABSTRACT

A rear suspension cross member (4) is suspended and supported on a lower side of a floor (2), and a drive unit (8) including a driving motor (9), an inverter (10) and a transaxle (11) is mounted on the rear suspension cross member (4). A power supply unit (20) including a junction box (21), a charger (22) and a DC-AC inverter (23) is mounted on the floor (2), and a terminal block (21a) of the junction box (21) is connected to a terminal block (10a) of the inverter (10) via a motor-side power cable (42). The junction box (21) and the inverter (10) are disposed on opposite sides of each other with respect to a center line (L) in the left-right direction of the vehicle body.

10 Claims, 6 Drawing Sheets

(58) Field of Classification Search
CPC .... B60K 2007/0046; B60K 2007/0053; B60K 2007/0061; B60L 53/22
See application file for complete search history.

(56) References Cited

U.S. PATENT DOCUMENTS

| | | | | |
|---|---|---|---|---|
| 8,556,016 | B2* | 10/2013 | Yoda | B60K 6/48 180/68.5 |
| 8,561,743 | B2* | 10/2013 | Iwasa | B62D 25/2036 180/68.5 |
| 8,720,636 | B2* | 5/2014 | Akoum | B60K 1/00 180/68.5 |
| 9,030,063 | B2* | 5/2015 | Rawlinson | H02K 9/20 310/52 |
| 10,814,711 | B2* | 10/2020 | Suumen | B62D 25/20 |
| 11,292,332 | B2* | 4/2022 | Mepham | F16H 57/02 |
| 11,780,314 | B2* | 10/2023 | Jeon | B60K 1/04 180/65.21 |
| 2008/0078603 | A1* | 4/2008 | Taji | H02K 5/00 180/312 |
| 2010/0025131 | A1* | 2/2010 | Gloceri | B60K 6/52 180/65.265 |
| 2010/0101885 | A1* | 4/2010 | Nozaki | B60K 1/00 180/232 |
| 2013/0235526 | A1 | 9/2013 | Watanabe | |
| 2016/0207386 | A1* | 7/2016 | Nagaosa | B60K 1/04 |
| 2018/0126835 | A1* | 5/2018 | Saeki | B60N 2/005 |
| 2018/0175350 | A1 | 6/2018 | Goitsuka et al. | |
| 2022/0324313 | A1* | 10/2022 | Tanizawa | B60K 1/04 |
| 2022/0363121 | A1* | 11/2022 | Tanizawa | B60N 2/3011 |
| 2022/0371420 | A1* | 11/2022 | Tanizawa | H02G 3/30 |
| 2022/0371421 | A1* | 11/2022 | Tanizawa | B60L 53/22 |
| 2023/0192015 | A1* | 6/2023 | Smith | H01M 50/204 180/65.51 |

FOREIGN PATENT DOCUMENTS

| | | |
|---|---|---|
| JP | 2014-193692 A | 10/2014 |
| JP | 2018-99911 A | 6/2018 |
| JP | 2019-151174 A | 9/2019 |
| JP | 2019-166918 A | 10/2019 |

OTHER PUBLICATIONS

Written Opinion (PCT/ISA/237) issued in PCT/JP2020/041650, dated Dec. 22, 2020.
International Preliminary Report on Patentability and English translation of the Written Opinion of the International Searching Authority for International Application No. PCT/JP2020/041650, dated Jul. 19, 2022.
Japanese Office Action dated Mar. 1, 2023 issued in Japanese Applicatoin No. 2021-570656 with an English Translation.
Extended European Search Report for corresponding European Application No. 20913212.5, dated Jun. 9, 2023.

* cited by examiner

ARRANGEMENT STRUCTURE OF DRIVE UNIT AND POWER SUPPLY UNIT IN ELECTRIC VEHICLE

TECHNICAL FIELD

The present invention relates to an arrangement structure of a drive unit and a power supply unit in an electric vehicle.

BACKGROUND ART

Electric vehicles are equipped with various power supply units that control the input and output of electric power to/from a driving battery. Examples of such power supply units include a junction box that connects a driving battery and an electric load such as a driving motor, a charger that charges the driving battery with power from an external power supply at a charging station or the like, a DC-AC inverter that converts DC power from the driving battery to AC power to enable home appliances or an inverter to perform power drive control or regenerative control on the driving motor, and such power supply units are connected to electric loads such as the driving battery and the driving motor via a power cable.

For example, an electric vehicle described in Patent Document 1 supports left and right rear wheels by a rear suspension cross member suspended and supported on a lower side of a floor of a vehicle body and mounts a driving motor, an inverter of the driving motor and a transaxle as the drive unit on the suspension cross member to drive the rear wheels. Furthermore, the electric vehicle mounts a junction box, a charger and a DC-AC inverter as a power supply unit on the suspension cross member in upper positions of the drive unit and connects each power supply unit, the inverter of the driving motor and the driving battery via the power cable.

PRIOR ART DOCUMENT

Patent Document

Patent Document 1: Japanese Patent Application Laid-Open No. 2019-151174

SUMMARY OF THE INVENTION

Problems to be Solved by the Invention

The technique in Patent Document 1 is a vehicle body structure with both the drive unit and the power supply unit mounted on the rear suspension cross member on the lower side of the floor. However, a vehicle body structure with the power supply unit mounted on the floor is also widely implemented. In such a case, the driving motor, the inverter and the transaxle are mounted on the lower side of the floor, and the junction box, the charger and the DC-AC inverter are mounted on the floor as the power supply unit. The junction box and the inverter of the driving motor are connected via the power cable, for example, DC power from the driving battery is supplied to the inverter from the junction box via the power cable, converted to three-phase AC power and supplied to the driving motor.

While the electric vehicle is running, the rear suspension cross member swings in response to input from a road surface and a drive reaction force or the like on the rear wheels, and so relative positional displacement occurs constantly between the junction box mounted on the floor and the inverter on the rear suspension cross member. On the other hand, power cables that carry large currents to drive the driving motor are thick and inevitably difficult to flex. In spite of such physical properties, the power cables absorb relative positional displacement as described above, and are subject to constant flexing, and for this reason, it is hard to say that it is desirable in terms of durability, and conventionally, countermeasures have been requested.

The present invention has been implemented to solve these problems and an object of the present invention is to provide an arrangement structure of a drive unit and a power supply unit in an electric vehicle, capable of improving durability of power lines connecting a junction box of a power supply unit and an inverter of a driving motor of the drive unit in a vehicle body structure of rear wheel drive in which the power supply unit is mounted on a floor of the vehicle body and the drive unit is disposed on a rear suspension cross member.

Means for Solving the Problems

In order to achieve the above object, an aspect of an arrangement structure of a drive unit and a power supply unit in an electric vehicle of the present invention is directed to an electric vehicle including a rear suspension cross member suspended and supported on a lower side of a floor of a vehicle body to support left and right rear wheels via a suspension, a drive unit mounted on the rear suspension cross member, including a driving motor, an inverter of the driving motor and a transaxle that decelerates rotation of the driving motor and transmits the rotation to the left and right rear wheels, and a power supply unit mounted on the floor, including a junction box that relays power from at least a driving battery and supplies the power to the inverter via a motor-side power cable, in which the junction box and the inverter are disposed on opposite sides of each other with respect to a center line in a vehicle width direction of the vehicle body (claim 1).

According to the arrangement structure of a drive unit and a power supply unit in an electric vehicle configured as described above, since the junction box and the inverter are disposed on opposite sides of each other with respect to the center line in the vehicle width direction of the vehicle body, the overall length of the motor-side power cable connecting both parts becomes longer, making it easier to provide slack in the cable routing.

As another aspect, the drive unit may be constructed of the transaxle and the inverter aligned side by side in the vehicle width direction across the driving motor, and the junction box may be disposed on the transaxle side with respect to the center line in the vehicle width direction (claim 2).

According to the arrangement structure of a drive unit and a power supply unit in an electric vehicle configured as described above, the junction box is disposed on the transaxle side with respect to the center line in the vehicle width direction, and as a result, the junction box is disposed on the opposite side of the inverter with respect to the center line in the vehicle width direction.

As a further aspect, the junction box may be disposed so as to be apart from the inverter on the opposite side of the driving motor in the vehicle width direction (claim 3).

According to the arrangement structure of a drive unit and a power supply unit in an electric vehicle configured as described above, the junction box is disposed so as to be apart from the driving motor, and so the overall length of the motor-side power cable becomes longer.

As a still further aspect, the power supply unit includes a plurality of devices including the junction box, the junction box is disposed on the one endmost side of the power supply unit in the vehicle width direction, and the inverter is disposed on the other endmost side of the drive unit in the vehicle width direction (claim 4).

According to the arrangement structure of a drive unit and a power supply unit in an electric vehicle configured as described above, the inverter and the junction box are disposed as far apart as possible in the vehicle width direction within the constraint of the limited installation space of the drive unit and the power supply unit.

As a still further aspect, with respect to the terminal block of the junction box to which one end of the motor-side power cable is connected, a terminal block of the inverter to which the other end of the motor-side power cable is connected may be offset to either one of the front side and the rear side (claim 5).

According to the arrangement structure of a drive unit and a power supply unit in an electric vehicle configured as described above, the motor-side power cable is routed in a substantially L shape, and so the overall length is extended and slack is formed.

As a still further aspect, the terminal block of the junction box may be provided so as to face either one of the front side and the rear side where the terminal block of the inverter is offset and the terminal block of the inverter may be provided so as to face the junction box side in the vehicle width direction (claim 6).

According to the arrangement structure of a drive unit and a power supply unit in an electric vehicle configured as described above, the substantially L shape formed by the motor-side power cable becomes clearer.

As a still further aspect, the transaxle, and the left and right rear wheels may be connected via a pair of left and right drive shafts, and the pair of left and right drive shafts may be disposed on the other of the front side and the rear side corresponding to the opposite side from the offset-disposed terminal block of the inverter across the driving motor (claim 7).

According to the arrangement structure of a drive unit and a power supply unit in an electric vehicle configured as described above, the terminal block of the inverter is disposed on the opposite sides across the driving motor with respect to the pair of left and right drive shafts, and so the motor-side power cable can be routed easily and reliably.

As a still further aspect, the terminal block of the inverter may be offset to the rear side with respect to the terminal block of the junction box, and the motor-side power cable may be disposed inside a contour line of the rear suspension cross member in a plan view (claim 8).

According to the arrangement structure of a drive unit and a power supply unit in an electric vehicle configured as described above, the motor-side power cable is connected to the terminal block of the inverter disposed offset to the rear side, and as a result, the motor-side power cable is disposed on the rear side of the power supply unit and the drive unit. Since the motor-side power cable is disposed inside the contour line of the rear suspension cross member, when another vehicle collides with the rear surface, the electric vehicle is protected by the rear suspension cross member and wire breakage or the like is prevented.

As a still further aspect, the terminal block of the driving battery may be disposed on the junction box side with respect to the center line in the vehicle width direction, and connected to the terminal block of the junction box via a battery-side power cable (claim 9).

According to the arrangement structure of a drive unit and a power supply unit in an electric vehicle configured as described above, a routing path of a battery-side power cable can be shortened.

As a still further aspect, the electric vehicle may be a hybrid vehicle equipped with an engine as a driving power source in front of the driving battery in addition to the driving motor, and an exhaust pipe from the engine may bypass the driving battery on the opposite side of the terminal block of the driving battery with respect to the center line in the vehicle width direction and may be routed rearward (claim 10).

According to the arrangement structure of a drive unit and a power supply unit in an electric vehicle configured as described above, the exhaust pipe and the battery-side power cable are disposed without crossing each other, thus preventing heat damage from the hot exhaust pipe to the battery-side power cable.

Advantageous Effects of the Invention

According to the arrangement structure of a drive unit and a power supply unit in an electric vehicle of the present invention, it is possible to improve durability of the power line connecting the junction box of the power supply unit and the inverter of the driving motor of the drive unit in the vehicle body structure in which the power supply unit is disposed on the upper side of the floor of the vehicle body and the drive unit is disposed on the rear suspension cross member on the lower side of the floor.

MODE FOR CARRYING OUT THE INVENTION

Hereinafter, an embodiment of an arrangement structure of a drive unit and a power supply unit in an electric vehicle that embodies the present invention will be described.

Figure 1:
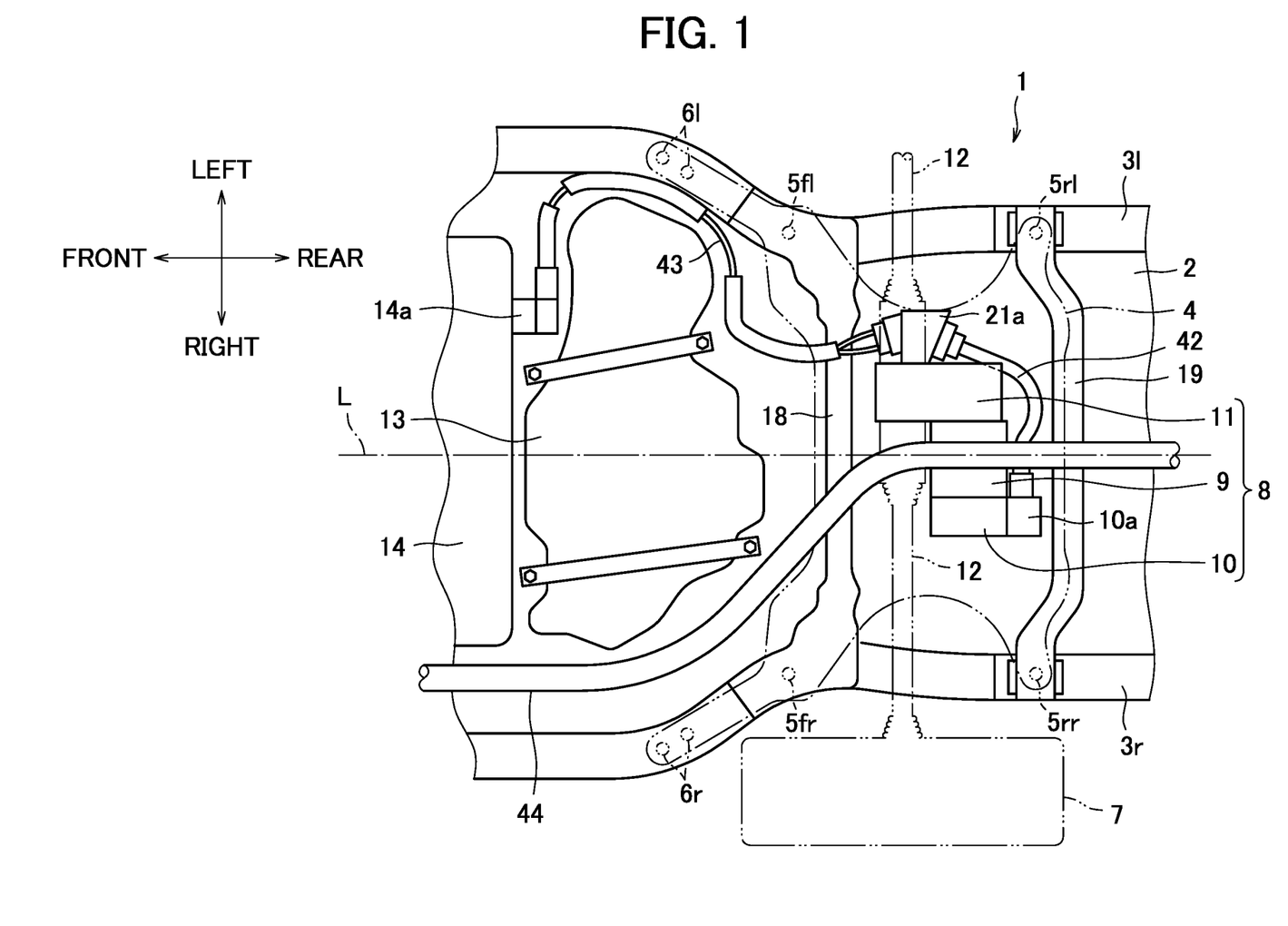
FIG. 1 is a bottom view illustrating a rear part of an electric vehicle according to an embodiment.
Figure 2:
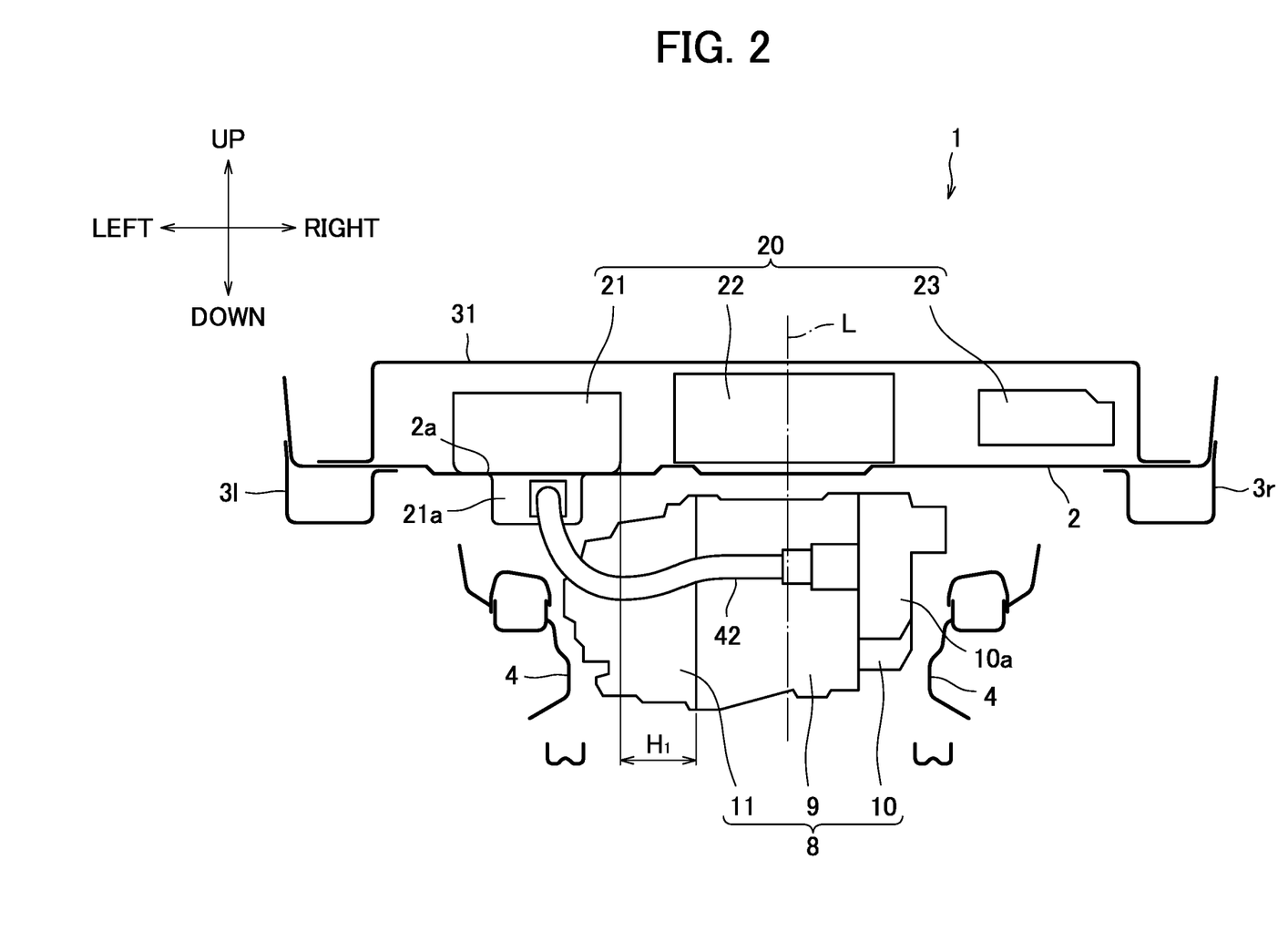
FIG. 2 is a cross-sectional view likewise viewing the rear part of the electric vehicle from behind.
Figure 3:
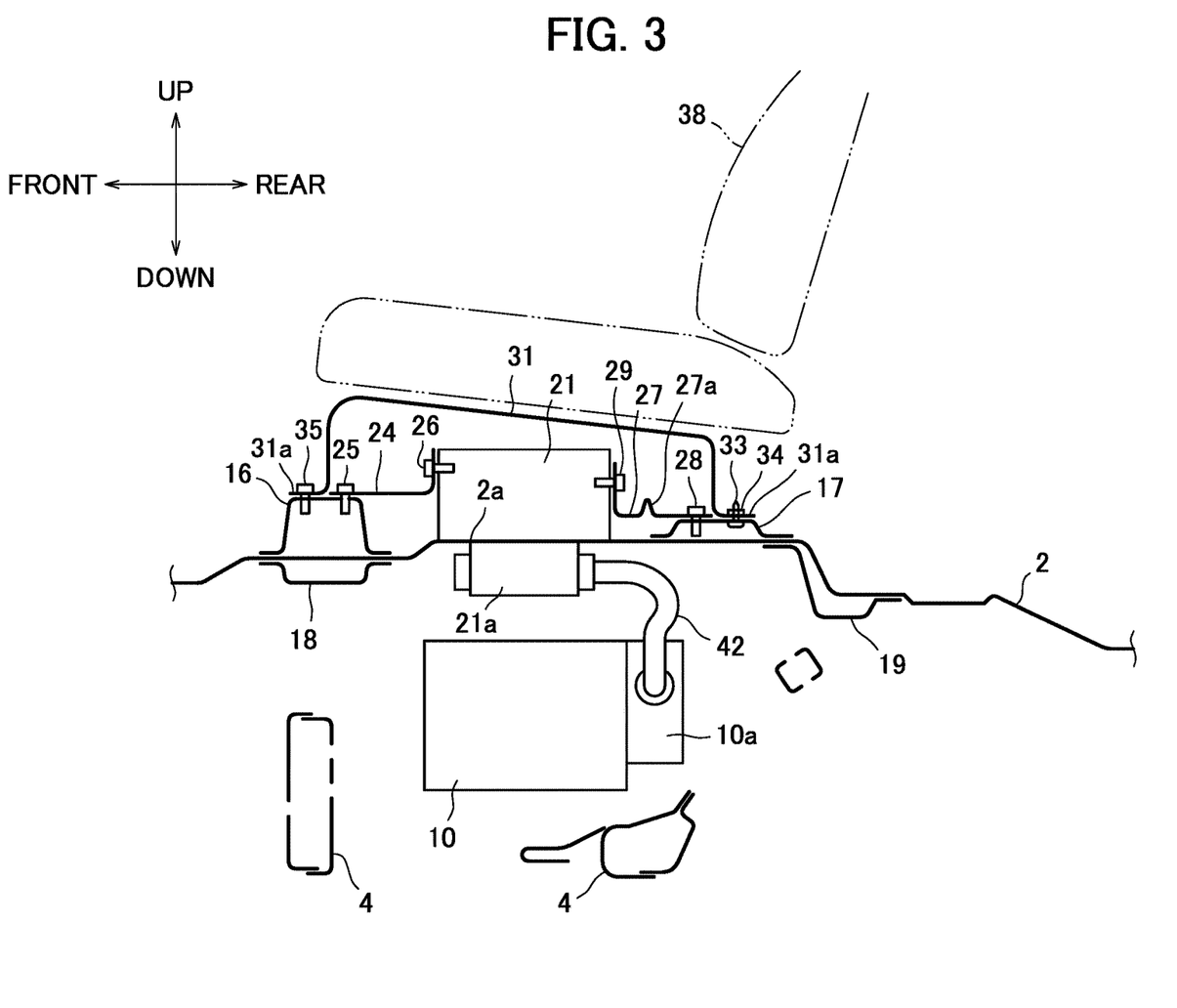
FIG. 3 is a cross-sectional view likewise viewing the rear part of the electric vehicle from the left side.

FIG. 1 is a bottom view illustrating a rear part of an electric vehicle according to the embodiment, FIG. 2 is a cross-sectional view likewise viewing the rear part of the electric vehicle from behind and FIG. 3 is a cross-sectional view likewise viewing the rear part of the electric vehicle from the left side. In the following description, front-rear, left-right and up-down directions will be expressed with the driver in the vehicle as a main subject and the left-right direction corresponds to the vehicle width direction of the present invention.

The electric vehicle of the present embodiment is a hybrid vehicle 1 equipped with a driving motor 9 and an engine (not shown), which will be described later as a driving power source. As shown in FIGS. 1 and 2, a pair of left and right side members 3*l* and 3*r* are provided on an undersurface of a floor 2 that constitutes the body of the hybrid vehicle 1 and each side member 3*l* or 3*r* forms a closed cross section with the floor 2, and is extended in a front-rear direction.

As shown by two-dot dashed lines in FIG. 1, a rear suspension cross member 4 is disposed on an underside of the floor 2 and both the left and right sides thereof are suspended and supported from the respective side members 3*l* and 3*r*. More specifically, support mounts 5*fl*, 5*fr*, 5*rl* and 5*rr* (hereinafter, called "fixed points") are provided at front and rear positions of the left and right side members 3*l* and 3*r*, and front left and right, and rear left and right parts of the rear suspension cross member 4 are suspended and supported from the respective fixed points 5*fl*, 5*fr*, 5*rl* and 5*rr*. Both left and right sides of the rear suspension cross member 4 are extended forward from the fixed points 5*fl* and 5*fr* at the front positions and fastened to the left and right side members 3*l* and 3*r* by a pair of bolts 6*l* and 6*r* respectively.

Left and right rear wheels 7 (only the right side is shown) are supported to the left side and the right side of the rear suspension cross member 4 via double-wishbone based suspension (not shown). Since the configuration of the suspension is well known, detailed description will be omitted, but the suspension is constructed of an upper arm, a lower arm, a toe control link, a spring and an absorber or the like. To resist input from the road surface and a drive reaction force on the rear wheels 7 or the like while the hybrid vehicle 1 is running, the rear suspension cross member 4 is manufactured from a thick steel sheet, has high strength and is supported by the left and right side members 3*l* and 3*r* with similarly high strength.

Figure 4:
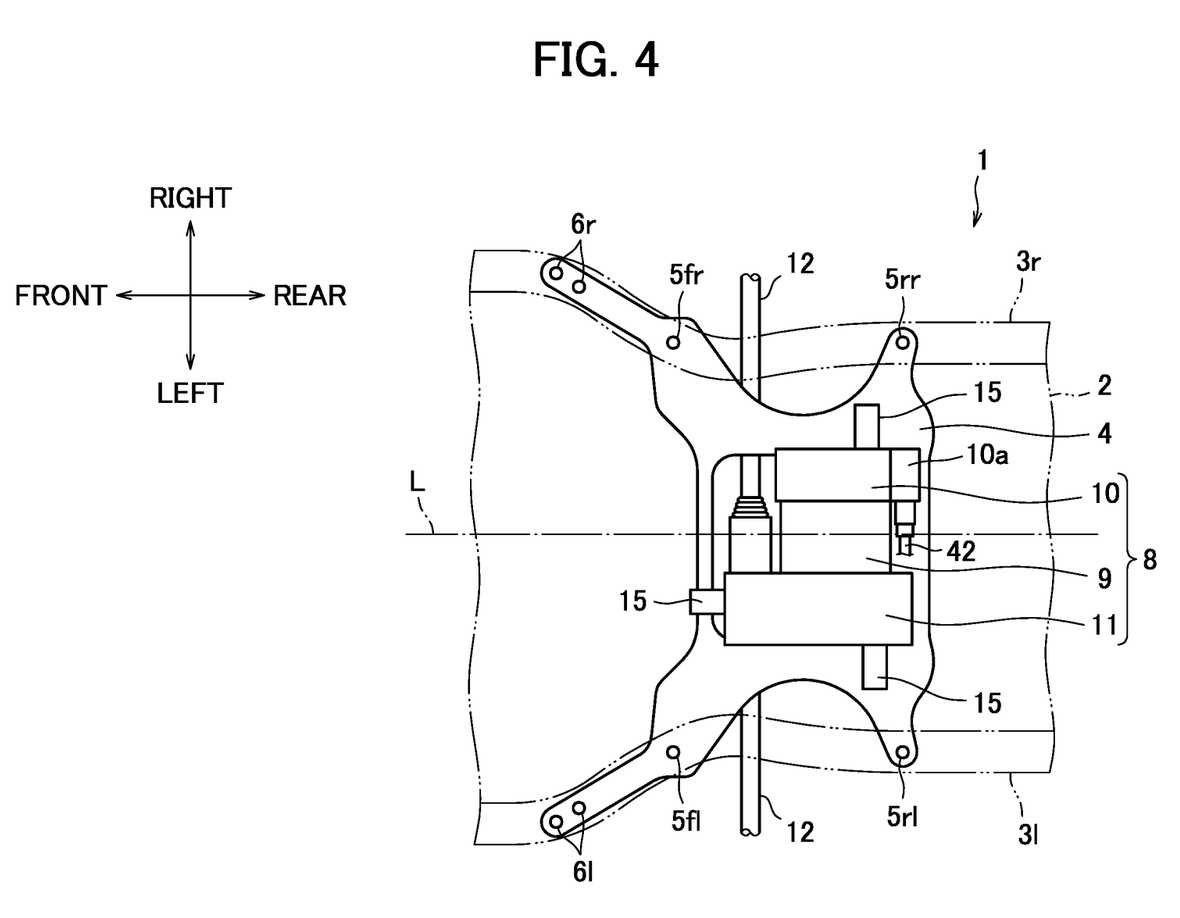
FIG. 4 is a plan view illustrating an arrangement of the drive unit on a rear suspension cross member.
Figure 5:
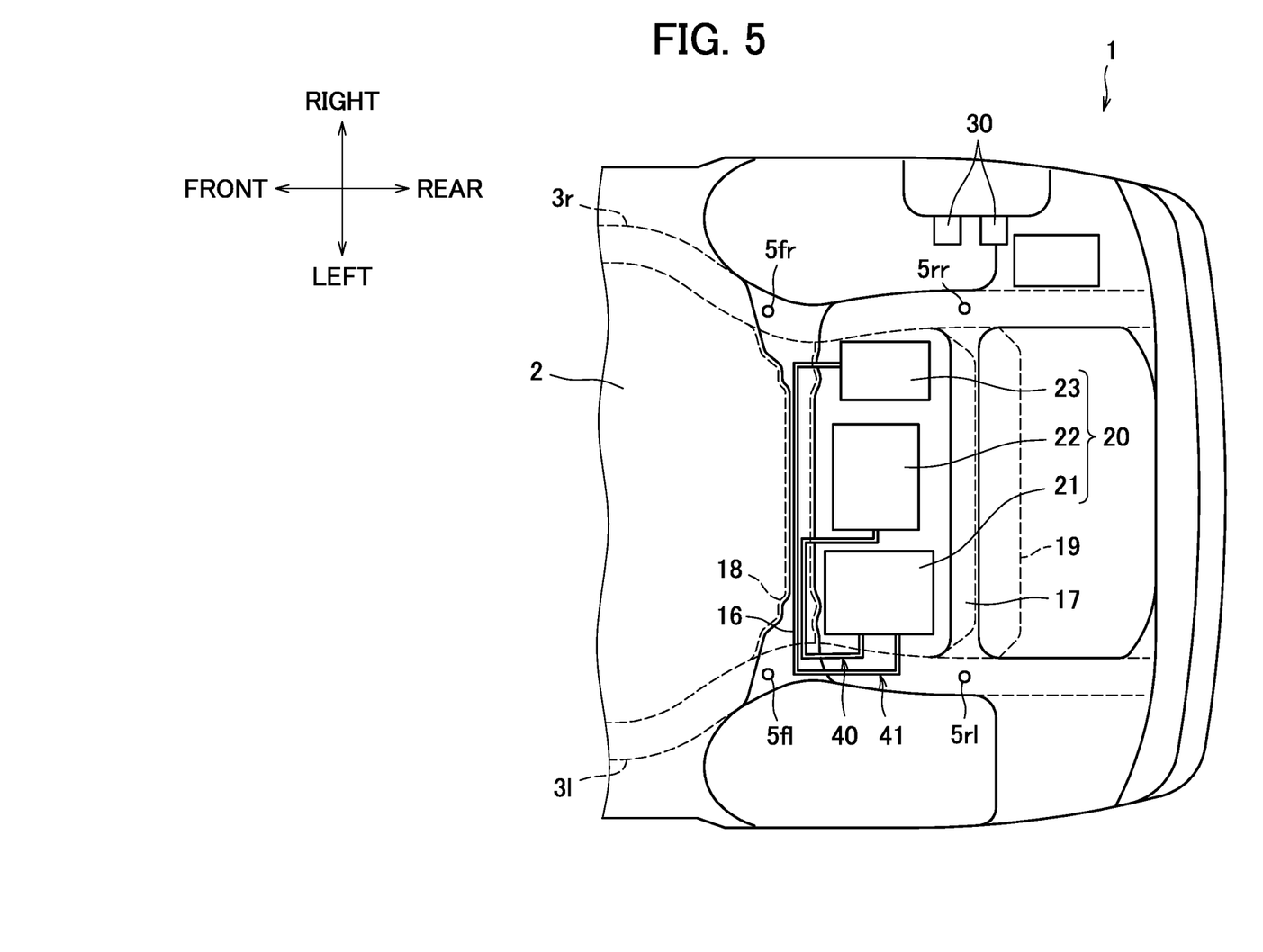
FIG. 5 is a plan view illustrating an arrangement of the power supply unit on the floor.
Figure 6:
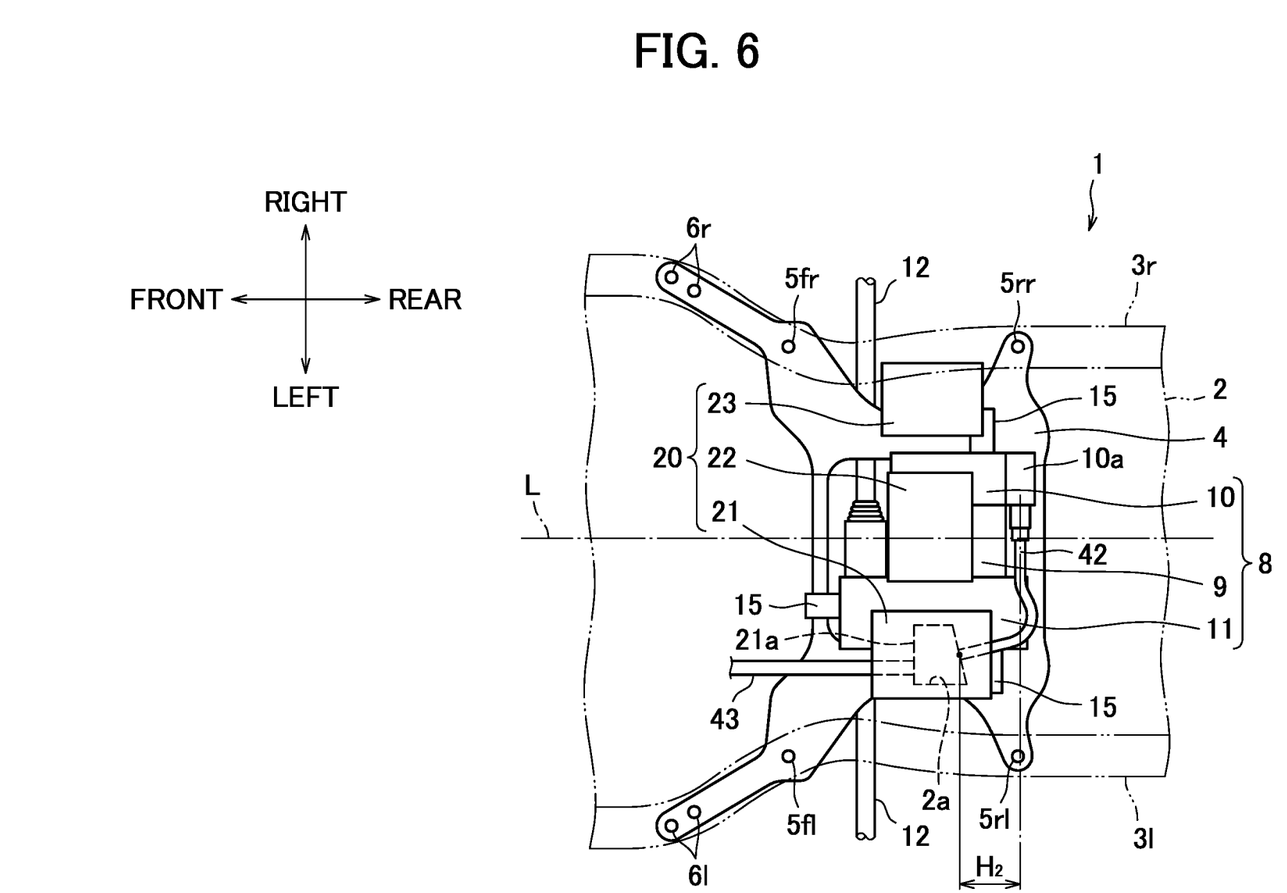
FIG. 6 is a plan view illustrating a positional relationship between the power supply unit and the drive unit, and a connection state.

FIG. 4 is a plan view illustrating an arrangement of the drive unit on the rear suspension cross member, FIG. 5 is a plan view illustrating an arrangement of the power supply unit on the floor 2 and FIG. 6 is a plan view illustrating a positional relationship between the power supply unit and the drive unit, and a connection state.

As shown in FIGS. 1, 2 and 4, a driving motor 9 as a drive unit 8, an inverter 10 provided integrally with the driving motor 9 and a transaxle 11 that functions as a reduction gear are mounted on the rear suspension cross member 4 on the lower side of the floor 2 via a support mount 15. In the present embodiment, the transaxle 11 and the inverter 10 are juxtaposed in the left-right direction on the left side and the right side respectively across the driving motor 9. The transaxle 11 is connected coaxially to the driving motor 9 and has a shape bulging forward of the driving motor 9. Inner ends of the drive shafts 12 are connected to both the left and right ends of the bulging part, the respective drive shafts 12 are extended to the left and to the right in front of the driving motor 9 and the left and right rear wheels 7 are connected to their outer ends.

The inverter 10 is provided integrally on the right side of the driving motor 9, a terminal block 10*a* of the inverter protrudes rearward of the driving motor 9 and a motor-side power cable 42, which will be described later, is connected to the left side surface of the terminal block 10*a*. The whole area of the drive unit 8 mounted on the rear suspension cross member 4 as described above is disposed inside the contour line of the rear suspension cross member 4 in a plan view. On the lower side of the floor 2, a fuel tank 13 that stores fuel of the engine, a driving power source (not shown), is disposed in front of the rear suspension cross member 4 and a driving battery 14 is disposed at the front of the fuel tank 13.

The driving motor 9 is driven and controlled by the inverter 10. For example, during power drive control, DC power from the driving battery 14 is converted to three-phase AC power by the inverter 10, supplied to the driving motor 9, and the rotation of the driving motor 9 is decelerated in the transaxle 11 and the left and right rear wheels 7 are driven via the drive shafts 12. On the other hand, during regenerative control, the rotations of the left and right rear wheels 7 are transmitted to the driving motor 9 via the drive shafts 12 and the transaxle 11, and three-phase AC power generated by the driving motor 9 is converted to DC power by the inverter 10 to charge the driving battery 14.

As shown in FIGS. 3 and 5, on the top surface of the floor 2, an upper front floor cross member 16 is provided between left and right fixed points 5*fl* and 5*fr* in the front position and an upper rear floor cross member 17 is provided between left and right fixed points 5*rl* and 5*rr* in the rear position, and the respective cross members are extended in the left-right direction while forming a closed cross section with the top surface of the floor 2 respectively, and both ends thereof are connected to the left and right side members 3*l* and 3*r*. On the undersurface of the floor 2, a lower front floor cross member 18 is provided between the left and right fixed points 5*fl* and 5*fr* in the front position, a lower rear floor cross member 19 is provided between the left and right fixed points 5*rl* and 5*rr* in the rear position, the respective cross members are extended in the left-right direction while forming a closed cross section with the undersurface of the floor 2 respectively, and both ends thereof are connected to the left and right side members 3*l* and 3*r*.

In the front-rear direction, the upper front floor cross member 16 and the lower front floor cross member 18 are integrated with all areas overlapping each other, whereas the upper rear floor cross member 17 and the lower rear floor cross member 19 are integrated with some areas overlapping each other.

As shown in FIGS. 3 to 5, a junction box 21, a charger 22 (corresponding to the plurality of devices of the present invention) and a DC-AC inverter 23 (corresponding to the plurality of devices of the present invention) are mounted in order from the left side on the floor 2 as a power supply unit 20. As is generally known, the junction box 21 is a device that connects the driving battery 14 and various electric loads such as the driving motor 9, the charger 22 is a device that charges the driving battery 14 with power from an external power supply at a charging station or the like via charging ports 30, and the DC-AC inverter 23 is a device that converts DC power of the driving battery 14 to AC power of 100 V to enable home appliances.

In short, the power supply unit 20 is mounted on the floor 2 using the upper front and upper rear floor cross members 16 and 17. The mounting state will be described based on FIGS. 3 and 5 by taking the junction box 21 as an example. One side of an L-shaped front bracket 24 is fixed to the upper front floor cross member 16 with a bolt 25 and the other side of the front bracket 24 is fixed to the front of the junction box 21 with a bolt 26. Similarly, one side of an L-shaped rear bracket 27 is fixed to the upper rear floor cross member 17 with a bolt 28 and the other side of the rear bracket 27 is fixed to the rear surface of the junction box 21 with a bolt 29. As a result, the front of the junction box 21 is supported and fixed from the upper front floor cross member 16 via the front bracket 24 and the rear of the junction box 21 is supported and fixed from the upper rear floor cross member 17 via the rear bracket 27.

A substantially triangular fragile part 27*a* is formed by bending in the rear bracket 27 so that in the event of a rear surface collision by another vehicle, the fragile part 27*a* is bent and deformed to exert impact absorption action. Although overlapping description will be omitted, similar mounting states are also applicable to the charger 22 and the DC-AC inverter 23. As shown in FIG. 3, the power supply unit 20 is covered from above with a unit cover 31 made of steel sheet in a shape of a square box that opens downward and accommodated therein. A flange 31a formed around the unit cover 31 is fastened to the top surfaces of the upper front and upper rear floor cross members 16 and 17 with a stud bolt 33 and a nut bolt 34 or a bolt 35, and the unit cover 31 is thereby fixed to the floor 2.

A third row seat 38 is disposed right above the unit cover 31, front and rear parts of which are mounted on the floor 2 via a bracket (not shown). For consideration of a passenger to be seated in the third row seat 38, the unit cover 31 blocks electromagnetic waves emitted from the power supply unit 20 and protects the power supply unit 20 from juice or the like spilled by passengers. The unit cover 31 also has an effect of blocking driving noise from the floor 2 using a sound absorbing material (not shown) mounted on an inner surface thereof.

As shown in FIG. 5, a power cable 40 connecting the junction box 21 and the charger 22 on the upper side of the floor 2 and in front of the power supply unit 20 is connected to an outer side of the junction box 21 in the vehicle and a side of the charger 22 on the junction box 21 side, and similarly, a power cable 41 connecting the junction box 21 and the DC-AC inverter 23 is connected to the outer side of the junction box 21 in the vehicle and a front side of the DC-AC inverter 23. As shown in FIGS. 2, 3 and 6, a terminal block 21a is provided on the undersurface of the junction box 21, fitted into a through hole 2a formed in the floor 2 and protruding downward. One end of the motor-side power cable 42 is connected to a rear surface of the terminal block 21a and the other end is connected to a left side surface of the terminal block 10a of the inverter 10. As is clear from FIG. 6, not only the drive unit 8 but also the motor-side power cable 42 is disposed inside the contour line of the rear suspension cross member 4 in a plan view.

Since the junction box 21 is disposed on the left most side of the power supply unit 20, and as shown in FIG. 1, the terminal block 21a of the junction box 21 is also located on the left side with respect to the center line L in the left-right direction. In correspondence with the position of the terminal block 21a in the left-right direction, one end of the battery-side power cable 43 provided on the left side (corresponding to the junction box side of the present invention) with respect to the center line L in the left-right direction is also connected to the terminal block 14a of the driving battery 14. The battery-side power cable 43 is routed so as to bypass the fuel tank 13 via the left side of the fuel tank 13 and the other end of the battery-side power cable 43 is connected to the terminal block 21a of the junction box 21.

Power exchange between the driving battery 14 and the charger 22, the DC-AC inverter 23 and the inverter 10 of the driving motor 9 is performed by relaying the junction box 21. For example, DC power from the driving battery 14 is supplied to the DC-AC inverter 23 via the junction box 21, converted to AC power of 100 V and used to operate home appliances. AC power supplied from an external power supply at a charging station or the like is converted to DC power by the charger 22 to charge the driving battery 14 via the junction box 21. During power drive control on the driving motor 9, DC power of the driving battery 14 is supplied to the inverter 10 via the junction box 21, converted to three-phase AC power, supplied to the driving motor 9. On the other hand, during regenerative control, the three-phase AC power generated by the driving motor 9 is converted to DC power by the inverter 10 to charge the driving battery 14 via the junction box 21.

On the other hand, the engine (not shown) is mounted as the driving power source in front of the driving battery 14 of the vehicle body. As shown in FIG. 1, an exhaust pipe 44 of the engine is routed rearward on the right side (corresponding to the opposite side of the terminal block of the driving battery of the present invention) with respect to the center line L in the left-right direction by bypassing the driving battery 14 and the fuel tank 13, and is connected to a silencer and an exhaust gas purifier (not shown) through the underside of the driving motor 9.

Next, an arrangement structure of the drive unit 8 and the power supply unit 20, characteristic parts of the present invention, and actions and effects obtained by the arrangement structure will be described. As shown in FIGS. 2 and 4, the inverter 10 on the rear suspension cross member 4 is disposed to the right side of the center line L in the left-right direction of the vehicle body (corresponding to the center line in the vehicle width direction of the present invention), whereas the junction box 21 on the floor 2 as shown in FIGS. 2 and 5 is disposed to the left side of the center line L in the left-right direction. As a result, as shown in FIGS. 2 and 6, the inverter 10 and the junction box 21 are disposed on opposite sides of each other with respect to the center line L in the left-right direction. Considering the above-described arrangement of the drive unit 8 side in the left-right direction, it can also be rephrased as that the junction box 21 is disposed on the transaxle 11 side with respect to the center line L in the left-right direction.

Moreover, the junction box 21 is disposed on the left most side of the power supply unit 20 (corresponding to one endmost side in the vehicle width direction of the present invention) and the inverter 10 is disposed on the right most side of the drive unit 8 (corresponding to the other endmost side in the vehicle width direction of the present invention). The installation space for the drive unit 8 on the rear suspension cross member 4 is limited, and the installation space for the power supply unit 20 on the floor 2 is likewise limited. However, by being biased to the opposite side inside the respective units 8 and 20, the inverter 10 and the junction box 21 are apart from each other in the left-right direction as much as possible within the constraints of the installation space. As a result, as shown in FIG. 2, the junction box 21 is apart by a dimension H1 from the driving motor 9 on the opposite side of the inverter 10 in the left-right direction. With such an arrangement, the overall length of the motor-side power cable 42 connecting the terminal block 21a of the junction box 21 and the terminal block 10a of the inverter 10 becomes longer and it is easier to provide slack in the cable routing.

While the hybrid vehicle 1 is running, relative positional displacement is constantly generated between the junction box 21 and the inverter 10 along with swinging of the rear suspension cross member 4. When compared with the same amount of positional displacement, the longer the motor-side power cable 42 is extended, and the more pronounced the slack, the less deflection per unit length of the motor-side power cable 42 becomes. A decrease in the amount of deflection means a reduction of load received by the motor-side power cable 42, and so durability can be improved consequently.

Extension of the motor-side power cable 42 and formation of slack can also be achieved by the following requirements: 1) As shown in FIG. 6, the terminal block 10a of the inverter 10 is offset to the rear side (corresponding to either one of the front side and the rear side of the present invention) from the terminal block 21a of the junction box 21 by a dimension H2. For this reason, the motor-side power cable 42 is routed in a substantially L shape in a plan view.

2) As shown in FIG. 6, the terminal block 21a of the junction box 21 is provided so as to face the rear side (corresponding to either one of the front side and the rear side of the present invention), the terminal block 10a of the inverter 10 is provided so as to face the left side (corresponding to the junction box side in the vehicle width direction of the present invention). Therefore, the motor-side power cable 42 is drawn rearward from the terminal block 21a of the junction box 21 and the motor-side power cable 42 is drawn to the left side from the terminal block 10a of the inverter 10, and so the substantially L shape formed by the motor-side power cable 42 becomes clearer.

When neither requirement 1) nor 2) is satisfied, the motor-side power cable 42 is substantially linearly routed in the left-right direction between both terminal blocks 21a and 10a. However, in the present embodiment, routing of the cable in a substantially L shape causes the overall length to be extended by approximately the dimension H2 and such an extension is formed as slack. Thus, these factors also significantly contribute to a reduction of load of the motor-side power cable 42 or by extension, improvement in durability.

On the other hand, the left and right drive shafts 12 connecting the transaxle 11 and the rear wheels 7 are disposed in front of the driving motor 9, the terminal block 10a of the inverter 10 is offset to the rear side from the terminal block 21a of the junction box 21, and as a result, the terminal block 10a of the inverter 10 is disposed behind the driving motor 9. It can also be rephrased that the left and right drive shafts 12 are disposed on the front side, an opposite side of the terminal block 10a of the inverter 10 across the driving motor 9 (corresponding to the other of the front side and the rear side of the present invention).

Routing the motor-side power cable 42 between the terminal block 10a and the terminal block 21a requires a space for routing or a space for using tools such as a spanner. For this reason, if the motor-side power cable 42 is routed in front of the driving motor 9 as in the case of the left and right drive shafts 12, it may be difficult or impossible to carry out the work. Routing the motor-side power cable 42 on the opposite sides of the left and right drive shafts 12 can avoid such inconvenience or easily and reliably route the motor-side power cable 42.

On the lower side of the floor 2, the motor-side power cable 42 routed in this way is disposed behind the power supply unit 20 and the drive unit 8, and so it is preferable to provide protective countermeasures in the event of a rear surface collision by another vehicle. In the present embodiment, as is clear from FIG. 6, the motor-side power cable 42 together with the drive unit 8 is disposed inside the contour line of the rear suspension cross member 4 in a plan view. Since the rear suspension cross member 4 having high strength does not easily deform by receiving intense input, and can thereby obtain an effect of preventing wire breakage or the like of the motor-side power cable 42.

On the other hand, as shown in FIG. 1, both the terminal block 21a of the junction box 21 and the terminal block 14a of the driving battery 14 are disposed on the left side with respect to the center line L in the left-right direction, and the battery-side power cable 43 connecting both terminal blocks 21a and 14a is routed so as to bypass the fuel tank 13 via the left side of the fuel tank 13. Therefore, an effect of being able to shorten the routing path of the battery-side power cable 43 can also be obtained.

In contrast to the battery-side power cable 43 routed in this way, the exhaust pipe 44 of the engine is routed backward by bypassing the driving battery 14 and the fuel tank 13 on the right side with respect to the center line L in the left-right direction. As a result, the exhaust pipe 44 and the battery-side power cable 43 are disposed without crossing each other, and it is possible to prevent heat damage to the battery-side power cable 43 caused by the hot exhaust pipe 44, and thereby improve durability of the battery-side power cable 43 as well.

In addition, the exhaust pipe 44 routed rearward is connected to the silencer and the exhaust gas purifier at the rear via the lower part of the driving motor 9. If the exhaust pipe 44 is disposed below the inverter 10, heat damage spreads to the inverter 10 and if the exhaust pipe 44 is disposed below the transaxle 11 having a shape bulging downward to accommodate the gear train, although a minimum ground clearance of the vehicle body decreases, these problems can be avoided.

This completes the description of the present embodiment. However, the aspects of the present invention are not limited to the present embodiment. For example, the above-described embodiment embodies an arrangement structure of the drive unit 8 and the power supply unit 20 in the hybrid vehicle 1, but the present invention is not limited to this. The invention can be arbitrarily changed for an electric vehicle in which the junction box 21 of the power supply unit 20 mounted on the floor 2 is connected to the inverter 10 of the drive unit 8 mounted on the rear suspension cross member 4 below the floor 2 via the motor-side power cable 42. The invention can be applied, for example, to an electric vehicle equipped with a motor as the driving power source.

In the above-described embodiment, the driving motor 9, the inverter 10 and the transaxle 11 are disposed on the rear suspension cross member 4 as the drive unit, and the junction box 21, the charger 22 and the DC-AC inverter 23 are disposed on the floor 2 as the power supply unit 20, but the types and the arrangement thereof are not limited to this. For example, instead of disposing the driving motor 9, the inverter 10 and the transaxle 11 side by side in the left-right direction, the inverter 10 may be disposed behind or above the driving motor 9. If the junction box 21 is disposed on the opposite side of the inverter 10 with respect to the center line L in the left-right direction, effects similar to those in the above-described embodiment can be achieved in this case, too.

In the above-described embodiment, although the junction box 21, the charger 22 and the DC-AC inverter 23 are disposed on the upper side of the floor 2 as the power supply unit 20, the present invention is not limited to this.

In the above-described embodiment, the left and right drive shafts 12 are disposed at the front across the driving motor 9 and the terminal block 10a of the inverter 10 is disposed at the rear, but the present invention is not limited to this. For example, the front-rear positional relationship may be reversed such that the terminal block 10a of the inverter 10 is disposed at the front and the left and right drive shafts 12 are disposed at the rear, and effects similar to those in the above-described embodiment can be achieved in this case, too.

EXPLANATION OF REFERENCE SIGNS 1 electric vehicle
2 floor
4 rear suspension cross member
7 rear wheel 8 drive unit
9 driving motor
10 inverter
10a, 14a, 21a terminal block
11 transaxle
12 drive shaft
14 driving battery
20 power supply unit
21 junction box
22 charger (plurality of devices)
23 DC-AC inverter (plurality of devices)
42 motor-side power cable
43 battery-side power cable
44 exhaust pipe

The invention claimed is:

1. An arrangement structure of a drive unit and a power supply unit in an electric vehicle, comprising:
 a rear suspension cross member suspended and supported on a lower side of a floor of a vehicle body to support left and right rear wheels via a suspension;
 a drive unit mounted on the rear suspension cross member, comprising a driving motor, an inverter of the driving motor and a transaxle that transmits power of the driving motor to the left and right rear wheels; and
 a power supply unit mounted on the floor, comprising a junction box that relays power from at least a driving battery and supplies the power to the inverter via a motor-side power cable, wherein
 the junction box and the inverter are disposed on opposite sides of each other with respect to a center line in a vehicle width direction of the vehicle body.

2. The arrangement structure of a drive unit and a power supply unit in an electric vehicle according to claim 1, wherein
 the drive unit comprises the transaxle and the inverter aligned side by side in the vehicle width direction across the driving motor, and
 the junction box is disposed on the transaxle side with respect to the center line in the vehicle width direction.

3. The arrangement structure of a drive unit and a power supply unit in an electric vehicle according to claim 2, wherein the junction box is disposed so as to be apart from the inverter on the opposite side of the driving motor in the vehicle width direction.

4. The arrangement structure of a drive unit and a power supply unit in an electric vehicle according to claim 1, wherein the power supply unit comprises a plurality of devices including the junction box,
 the junction box is disposed on the one endmost side of the power supply unit in the vehicle width direction, and
 the inverter is disposed on the other endmost side of the drive unit in the vehicle width direction.

5. The arrangement structure of a drive unit and a power supply unit in an electric vehicle according to claim 1, wherein, with respect to the terminal block of the junction box to which one end of the motor-side power cable is connected, a terminal block of the inverter to which the other end of the motor-side power cable is connected is offset to either one of the front side and the rear side in the vehicle front-rear direction.

6. The arrangement structure of a drive unit and a power supply unit in an electric vehicle according to claim 5, wherein the terminal block of the junction box is provided so as to face either one of the front side and the rear side in the front-rear direction where the terminal block of the inverter is offset, and
 the terminal block of the inverter is provided so as to face the junction box side in the vehicle width direction.

7. The arrangement structure of a drive unit and a power supply unit in an electric vehicle according to claim 5, wherein the transaxle, and the left and right rear wheels are connected via a pair of left and right drive shafts, and
 the pair of left and right drive shafts are disposed on the other of the front side and the rear side corresponding to the opposite side from the offset-disposed terminal block of the inverter across the driving motor in the front-rear direction.

8. The arrangement structure of a drive unit and a power supply unit in an electric vehicle according to claim 1, wherein the terminal block of the inverter is offset to the rear side in the front-rear direction with respect to the terminal block of the junction box, and
 the motor-side power cable is disposed inside a contour line of the rear suspension cross member in a plan view.

9. The arrangement structure of a drive unit and a power supply unit in an electric vehicle according to claim 1, wherein the terminal block of the driving battery is disposed on the junction box side with respect to the center line in the vehicle width direction, and connected to the terminal block of the junction box via a battery-side power cable.

10. The arrangement structure of a drive unit and a power supply unit in an electric vehicle according to claim 9, wherein
 the electric vehicle is a hybrid vehicle equipped with an engine as a driving power source in front of the driving battery in addition to the driving motor, and
 an exhaust pipe from the engine bypasses the driving battery on the opposite side of the terminal block of the driving battery with respect to the center line in the vehicle width direction and is routed rearward through the lower side of the driving motor.

* * * * *